United States Patent
Fünfgeld

(10) Patent No.: US 6,681,626 B2
(45) Date of Patent: Jan. 27, 2004

(54) LEVEL METERING DEVICE WORKING ON THE GUIDED MICROWAVE PRINCIPLE, COMPRISING A SINGLE-WIRE LINE AND SPECIFIC CONNECTION PIECE, AND CONNECTION PIECE FOR A LEVEL METERING DEVICE OF THIS TYPE

(75) Inventor: Martin Fünfgeld, Malsch-Waldprechtsweier (DE)

(73) Assignee: VEGA Grieshaber KG (DE)

(*) Notice: Subject to any disclaimer, the term of this patent is extended or adjusted under 35 U.S.C. 154(b) by 0 days.

(21) Appl. No.: 09/951,357

(22) Filed: Sep. 13, 2001

(65) Prior Publication Data

US 2002/0104391 A1 Aug. 8, 2002

Related U.S. Application Data

(60) Provisional application No. 60/257,955, filed on Dec. 26, 2000.

(30) Foreign Application Priority Data

Sep. 18, 2000 (DE) .......................... 100 45 997

(51) Int. Cl.$^7$ .............................................. G01F 23/00
(52) U.S. Cl. .................... 73/290 V; 73/304 R; 342/124
(58) Field of Search ............... 73/290 V, 304 R; 342/124

(56) References Cited

U.S. PATENT DOCUMENTS

| | | | | | |
|---|---|---|---|---|---|
| 4,465,088 A | * | 8/1984 | Vosper | ...................... | 122/504 |
| 4,991,915 A | * | 2/1991 | Thompson et al. | .......... | 324/632 |
| 5,391,839 A | * | 2/1995 | Lang et al. | ................ | 174/65 R |
| 5,554,936 A | * | 9/1996 | Mohr | ......................... | 324/446 |
| 5,669,263 A | * | 9/1997 | Borchers et al. | .......... | 73/304 C |
| 5,781,019 A | * | 7/1998 | Telder | ........................ | 324/632 |
| 5,827,985 A | | 10/1998 | Grieger et al. | ............. | 73/866.5 |
| 5,884,231 A | * | 3/1999 | Perdue et al. | ................ | 340/618 |
| 6,019,007 A | * | 2/2000 | Grieger et al. | ............. | 73/866.5 |
| 6,178,817 B1 | * | 1/2001 | Hewelt et al. | ............... | 324/637 |
| 6,276,199 B1 | * | 8/2001 | Eckert et al. | ................ | 343/872 |

FOREIGN PATENT DOCUMENTS

| | | | | |
|---|---|---|---|---|
| DE | 4404745 | 8/1995 | ........... | G01F/23/28 |
| DE | 10019129 | 10/2001 | ........... | B65D/90/47 |
| EP | 0773433 | 5/1997 | ......... | G01F/23/284 |
| EP | 0780664 | 6/1997 | ......... | G01F/23/284 |
| EP | 0834722 | 4/1998 | ......... | G01F/23/284 |

\* cited by examiner

*Primary Examiner*—Hezron Williams
*Assistant Examiner*—André K. Jackson
(74) *Attorney, Agent, or Firm*—Schwegman, Lundberg, Woessner & Kluth, P.A.

(57) ABSTRACT

The invention relates to a connection piece (20), comprising an upper connection piece part (21) and a connection piece wall (22) disposed below said upper connection piece part (21) and having a connection piece wall height (h). In said upper connection piece part (21), a level metering device (10) working on the guided microwave principle and comprising a single electric line (40) can be mounted. Connection piece (20) further comprises at least one electrical conductor (30a, 30b, 30c, 30d, 30e, 30f) spaced apart at a distance (a, a') from the single electric line (40) of the level metering device (10) to be mounted on the upper connection piece part (21) and extending from the upper connection piece part (21) up to at least the 0.25-fold, and maximally up to the 2.5-fold of the connection piece wall height (h). By arranging at least one electrical conductor (30a, 30b, 30c, 30d, 30e, 30f) in said connection piece (20), previous interfering influences caused by connection piece (20) during a filling level measurement are reduced. The invention further relates to a combination of a level metering device comprising a single-wire line, an attachment means and at least one additional electrical conductor having a limited length.

32 Claims, 3 Drawing Sheets

Figure 1:
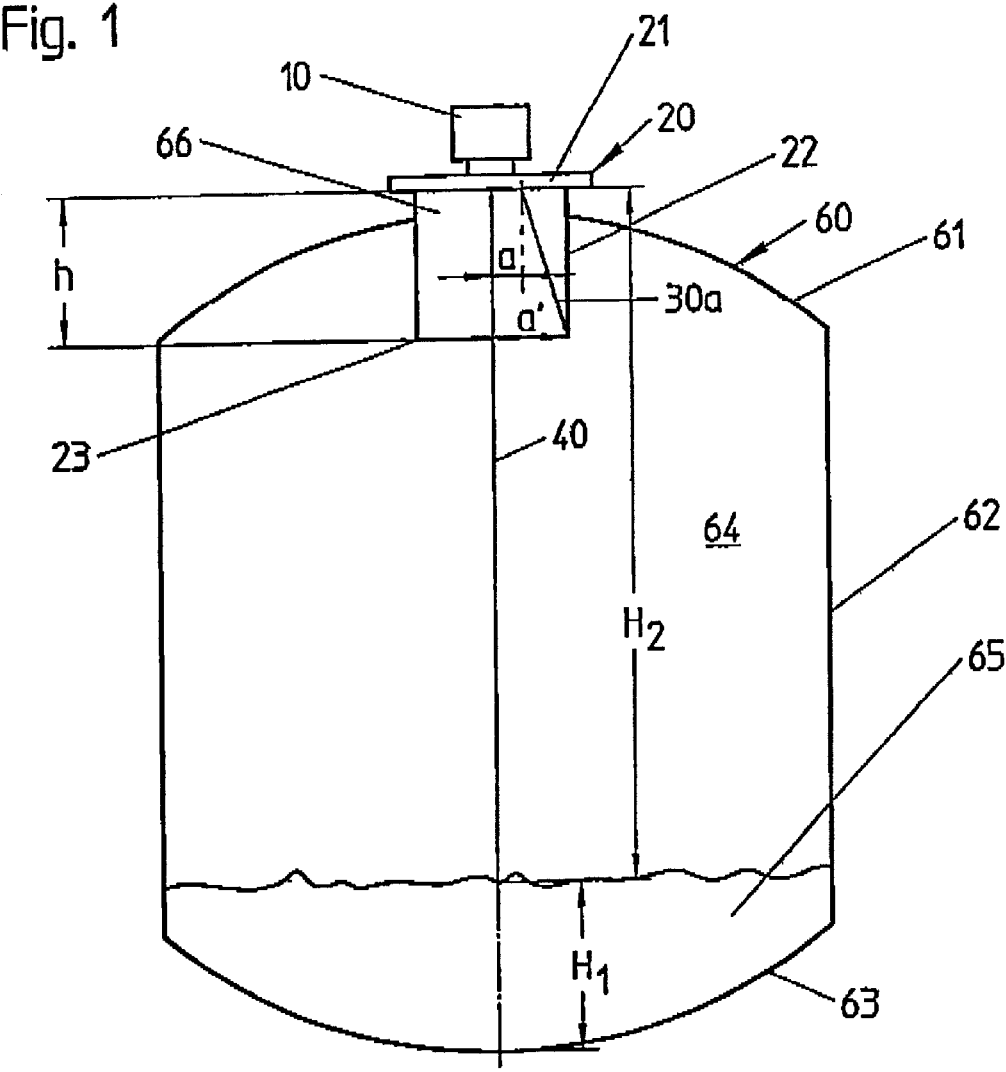

LEVEL METERING DEVICE WORKING ON THE GUIDED MICROWAVE PRINCIPLE, COMPRISING A SINGLE-WIRE LINE AND SPECIFIC CONNECTION PIECE, AND CONNECTION PIECE FOR A LEVEL METERING DEVICE OF THIS TYPE

REFERENCE TO RELATED APPLICATION(S)

The present application claims priority under 35 U.S.C. 119 of U.S. provisional application no. 60/257,955, filed Dec. 26, 2000 and German patent application no. 100 45 997.8 filed, Sep. 18, 2000.

TECHNICAL FIELD

The invention relates to a connection piece for a level metering device working on the guided microwave principle, with said level metering device comprising a single-wire line. A connection piece of this type comprises an upper connection piece part and a connection piece wall disposed below said upper connection piece part, said upper connection piece part having a connection piece wall height. Said upper part of the connection piece is configured so as to allow for the attachment of a level metering device working on the guided microwave principle, said level metering device having a single electrical conductor or a single electric line.

Such connection pieces are in particular mounted in receptacles such as tanks, reservoirs for any kinds of filling products, open receptacles, etc. Connection pieces of the herein mentioned kind can, however, be used in floor or wall elements.

The invention further relates to a combination of a level metering device working on the guided microwave principle and having a single single-wire line for guiding the microwave to the filling product to be measured, and an interference-reducing attachment means such as a connection piece or a flange, on which the level metering device is mounted.

In this context, it is the question of a guided microwave—also called "Time Domain Reflectometry (TDR)"—when high-frequency microwave pulses are guided along an electrical conductor. Such an electrical conductor can be, for example, a wire, a steel cable, or also a metal rod. The electrical conductor extends up to the filling product. When impinging on the surface of the filling product, the microwave pulses are reflected. The transit time of the pulses is evaluated by the electronic unit integrated in the most cases in the level metering device, and is outputted as the filling level. By means of such level metering devices, the filling levels of all kinds of bulk goods but also of fluids and liquids can be measured. The advantage of these level metering devices resides in that the density, conductivity and dielectricity of the filling product do not impede the measurements. Even changing bulk good properties cannot influence the measured value. Thus, in particular, lime, cement, cereals, plastics pellets, flour and gravel can also be measured by means of level metering devices of the mentioned kind. The filling level is also reliably detected in filling products exhibiting a changing humidity or varying dielectricity. In particular, even high, tapered receptacles, in which contact-free measurement procedures often exhibit difficulties, can be measured by means of the mentioned level metering devices without any problem. One level metering device of this type is, for example, distributed under the designation Vegaflex. In this respect, it is to be noted that the term "level metering device" also includes devices, the evaluating electronic unit of which is not directly integrated into a housing of the level metering device but is accommodated at another location.

PRIOR ART

Level metering devices of the above-mentioned kind are often mounted in connection pieces of a receptacle containing a filling product. For receiving a level metering device of the above-described kind, such connection pieces are basically comprised of an upper connection piece part in the form of a flange plate having a central bore therethrough, and a connection piece wall disposed therebelow, such as a tube piece, for example. The connection piece wall may be configured cylindrical in its cross-section or also polygonal. In most cases, said connection pieces are made of metal, and the upper connection piece part and the connection piece wall are correspondingly welded together in most cases. Of course, different connection techniques can also be employed for these connection piece parts depending on the field of application. Even a one-part configuration could be considered.

When a level metering device working on the guided microwave principle, is mounted into a connection piece, then superpositions arise in the so-called echo profile curve. These superpositions depend in particular on the connection piece radius and can propagate over several meters beyond the end of the connection piece, i.e. the free edge of the connection piece wall. With very small or even with very large connection piece radii, no or only relatively small superpositions arise, but such interfering superpositions are frequent with the connection piece sizes present in the industrial plant engineering. The superpositions complicate or even render a detection of smaller echoes impossible. Thus, in particular directly at the end of the connection piece or in the close neighborhood thereof, echoes cannot be or can only be hardly detected. In the worst case, such superpositions can have the effect that a reasonable level metering cannot be effected.

For eliminating this problem, it is already known to use a so-called horn which surrounds the level metering device at least in the area of the connection piece. In this respect, reference is made, for example, to DE 44 04 745 A1. In the therein shown device for level metering, a transmitter and receiver means and a single conductor extending into the filling product to be measured is present. Said transmitter and receiver means is connected with the single conductor via a coaxial line. In this configuration, electromagnetic waves emitted by the transmitter are guided through the single conductor towards the filling product, are reflected by the surface thereof and detected by the receiver means. By means of a matching funnel made of electrically conductive material, attached to a mounting flange, an impedance matching between the coaxial line and the single conductor is achieved, thus reducing reflection during transmission of the measurement signal. The matching funnel hereby comprises a funnel-type contour expanding towards the surface of the filling product.

From EP 0 780 664 A2, a sensor device for level metering is likewise known, wherein the signal emitted by a transmitter means is guided up to the filling product via a conductive rod. In this case, the rod is connected to the receptacle via a system of several flanges which could be interpreted as connection pieces.

It is also known to provide two parallel lines instead of the single-wire line; in this case, however, it is the question of a level metering device working on the guided microwave principle comprising a two-wire line. It is moreover known to provide a coaxial line instead of the single-wire line.

All these known solutions require large expenditures and are expensive to produce and are also difficult to mount. Thus, it is necessary, in particular with the level metering device comprising two lines, to provide spacers in regular intervals so as to ensure that said two lines always exhibit exactly the same distance therebetween. These spacers, however, generate interfering reflections and hence measurement inaccuracies. It may also be the case that deposits settle between two lines, a fact which could lead to a failure or inaccuracies of the measurement. The same applies to the solution using a coaxial line. The coaxial line has further the problem of not being usable in case of bulk goods.

DESCRIPTION OF THE INVENTION

The invention is therefore based on the technical problem of providing a connection piece, which is simple and cost-efficient to produce and, nevertheless causes minor interfering effects when being used in combination with a level metering device comprising a single-wire line and working on the guided microwave principle.

The invention is further based on the technical problem of providing a combination of a level metering device comprising a single-wire line and working on the guided microwave principle, and an attachment means such as, for example, a connection piece, serving for attaching the level metering device on a receptacle, with said combination of level metering device and attachment means being supposed to cause less interferences than hitherto.

The first mentioned technical problem is solved according to a first aspect of the invention by a connection piece comprising an upper connection piece part, on which a level metering device working on the guided microwave principle can be mounted by means of a single electric line. Below said upper connection piece part, a connection piece wall is disposed having a connection piece wall height. At least one electrical conductor is present spaced apart from the single electric line of the level metering device to be mounted on the upper connection piece part, and extending from the upper connection piece part up to at least the 0.25-fold of the connection piece wall. It is particularly advantageous that the conductor extends to a maximum of the 2.5-fold of the connection piece wall.

According to a further aspect of the invention, a connection piece is provided configured for being combined with a level metering device working on the guided microwave principle, which is equipped with a single electric line for guiding microwave pulses to a surface of a filling product to be measured and for back-guiding reflected pulses, said connection piece comprising an upper connection piece part, in which the level metering device working on the guided microwave principle comprising a single electric line can be mounted, and a connection piece wall disposed below the upper connection piece part and having a connection piece wall height, and at least one electrical conductor being mounted on said connection piece, which electrical conductor being disposed at a distance apart from the single electric line of the level metering device to be mounted on the upper connection piece part, and extending from the upper connection piece part only up to the area, which is critical due to interfering reflections.

Such connection pieces reduce the superpositions hitherto caused by the connection piece itself. Therewith, echoes on the conductor for the microwave can henceforth also be detected in the proximate range or can at least be better detected than to date. For the first time, a two-wire line is modelled by the at least one additional conductor in the connection piece in the hitherto critical range, which two-wire line then verges into a one-wire line in the actual measurement zone. Therewith, the positive properties of the single-wire line are combined in the connection piece area with those of a two-wire line in an extremely advantageous manner. The enhanced insensitivity of the two-wire line with respect to interferences is here used for the area of the connection piece. Therewith, the previous positive properties of the level metering device comprising a single-wire line remain maintained in the actual measurement zone within the receptacle. It is further to be noted that the connection piece wall can be composed of one or more segments. It is not imperative that a continuous wall is formed. Each wall configuration showing an extension height from the connection piece, has to be included here.

Basically, it is also to be noted that one or more additional electrical conductors can be mounted in the connection piece. These additional electrical conductors can either be mounted in parallel or non-parallel to the single-wire line of the level metering device. In the latter case, their spacing from the single-wire line increases towards the free edge of the connection piece wall. Thereby ensues a slow impedance matching from the so-called input (start of the single-wire line at the level meter device) towards the open wave-guide. By the increasing, slowly rising impedance matching, impedance leaps which are disadvantageous for a measurement, are largely avoided and hence thereby causing interfering reflections, as well.

In particular with connection pieces made of metal, it is advantageous that the at least one electrical conductor is in contact with the connection piece wall. Thereby, the at least one electrical conductor is brought to the same electric potential as the connection piece, a fact which contributes to reducing the interference influences.

As already mentioned before, it is advantageous that the at least one additional electrical conductor comprises an increasing distance from the single-wire line of the level metering device towards the free edge of the connection piece wall. It is hereby still further advantageous that the electrical conductor is bent at least in a partial length area, whereby impedance leaps and thereby the interfering reflections caused can be prevented in a still better manner.

Initially, it has already been stated that for a reduction of the interfering influences of the connection piece, it is advantageous, according to the invention, that the conductor/s extend/s at least up to the 0.25-fold height of the connection piece height. Depending on the field of application, extensions of up to the 0.3-fold, 0.35-fold, 0.4-fold, . . . , 2.5-fold height of the connection piece wall can be suitable. Of course, extensions ranging in between the mentioned multiples are also possible, such as, for example, an extension of up to 0.31-fold or 0.36-fold of the mentioned height of the connection piece wall. Very good results have also been achieved when the end of the at least one additional electrical conductor is located in the area of the free edge of the connection piece wall. Furthermore, all intermediate heights are feasible, i.e. the conductor extends up to an arbitrary height lying in between the above-indicated values.

The initial distance between the at least one additional electrical conductor and the single-wire line of the level metering device can be set depending on the diameter and the height of the connection piece. With a connection piece diameter of 31 cm and a connection piece height of 33 cm, for example, a distance of 8 cm has proven to be extremely appropriate. Further appropriate distances can be assessed by simple tests.

An extremely simple and cost-efficient variant resides in configuring the at least one electrical conductor as a metal rod comprising a thread on one end, by means of which said metal rod is introduced in a corresponding thread bore on the upper connection piece part. Yet, it is also possible to provide any other kind of mounting, e.g. welding, soldering or clamp connection. The electrical conductor can also be configured as a wire or a cable, which in this case extends into the connection piece through corresponding mounts in the desired manner. Moreover, it is to be added that the cross-section of the at least one additional electrical conductor can be circular, square, rectangular or polygonal.

The second technical problem is solved by the combination of a level metering device working on the guided wave principle and being configured comprising a single-wire line, and an attachment means such as, for example, a connection piece, on which in turn at least one electrical conductor is mounted, which is disposed spaced apart from the single electric line of the level metering device and has a length by far shorter than the length of the single-wire line, hence only extends in particular up to the edge of the attachment means which only reaches up to the inner receptacle or only slightly beyond. Therewith, said additional conductor reaches in particular maximally up to the connection piece edge facing the inner receptacle or slightly beyond. That is, the at least one further electrical conductor does not extend into the actual measurement zone within the inner receptacle, but only into the area which is critical due to interfering reflections within the attachment space or the mounting connection piece. When the mounting connection piece has a connection piece wall height, it then extends in particular maximally up to the 2.5-fold connection piece wall height. The connection piece wall height has in particular to be measured as of the location where the single-wire line of the level metering device exits from the associated mounting in the level metering device.

Of course, such a combination of level metering device and attachment means can be modified correspondingly in accordance with the foregoing explanations as to the inventive connection piece, i.e. several conductors can also be present in parallel or non-parallel to the single-wire line in the exit zone. In particular, said several additional conductors can also be bent, particularly also so bent that the distance from the single-wire line of the level metering device gradually increases towards the filling product to be measured. The conductors can be attached in any possible way, and can in particular also be mounted through a thread in the attachment flange of the level metering device. Moreover, any possible kinds of cross-sections are of course imaginable, in particular circular cross-sections, but also polygonal cross-sections. Moreover, the diameters of the additional conductors can be adapted to the respective conditions.

SHORT DESCRIPTION OF THE DRAWINGS

Figure 2:
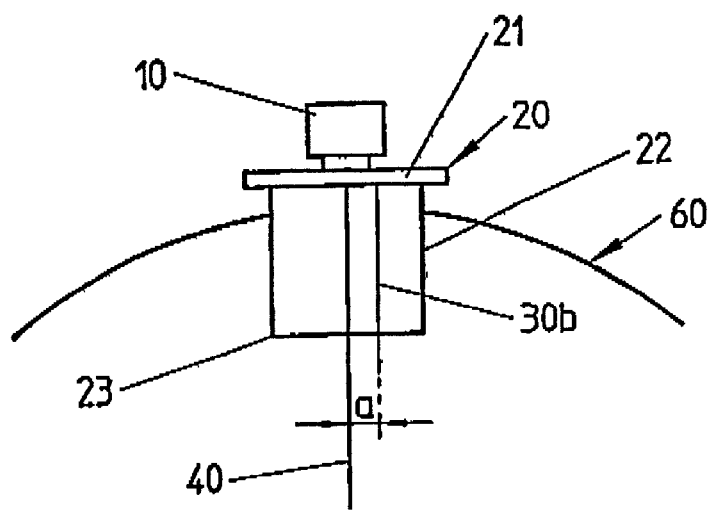
Figure 3:
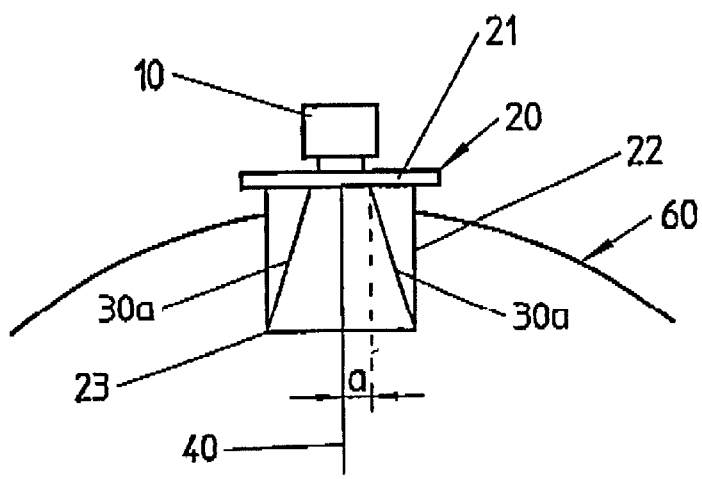
Figure 4:
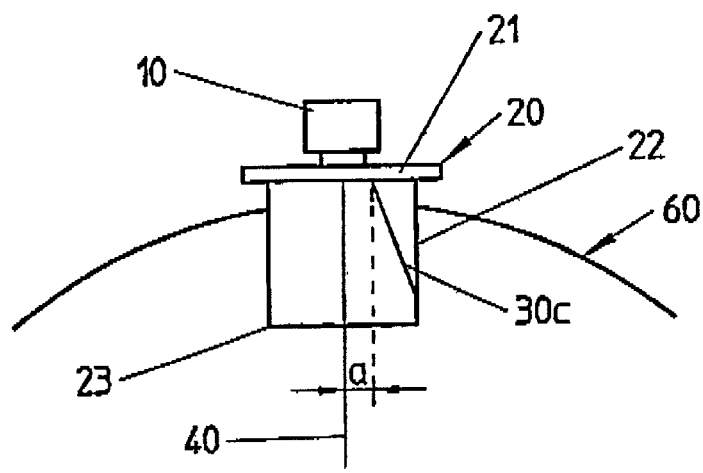
Figure 5:
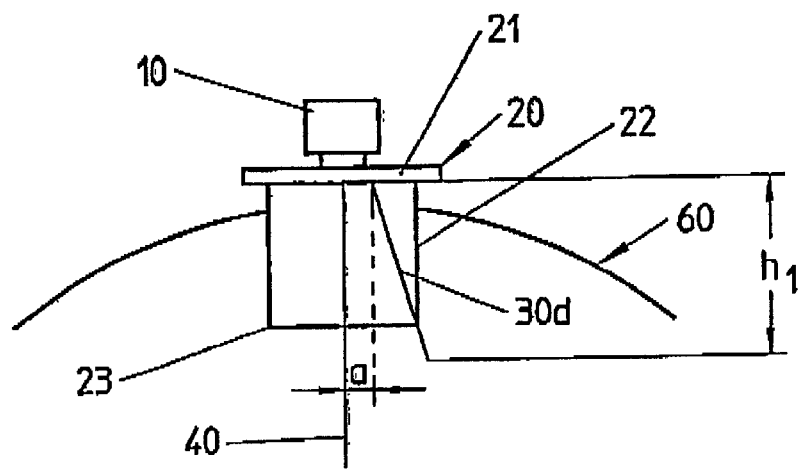
Figure 6:
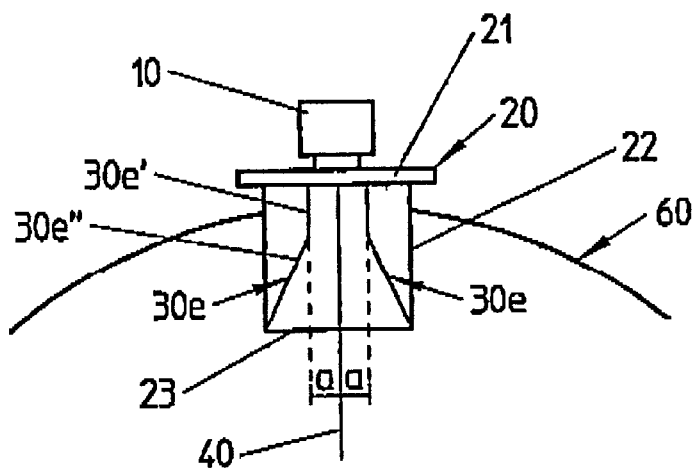
Figure 7:
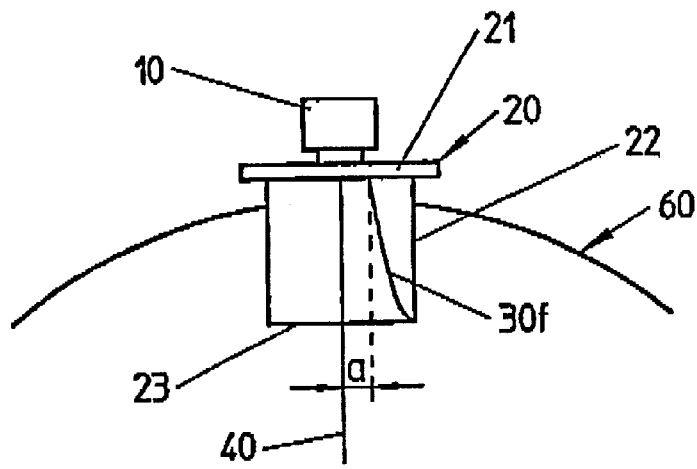
Figure 8:
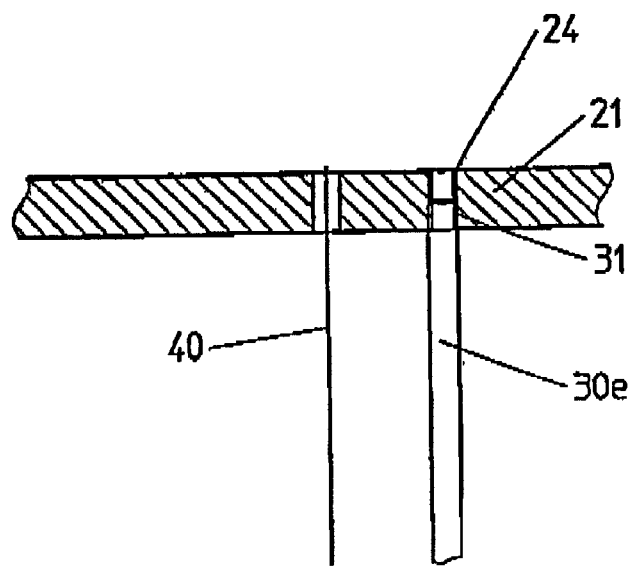

For further explanation and better understanding, several embodiments of the invention will be described in detail in the following. Therein shows:

FIG. 1 a schematic cross-sectional view of a receptacle comprising an inventive connection piece, on which is mounted a level metering device working on the guided microwave principle and comprising a single-wire line, FIG. 2 an inventive connection piece comprising an additional electrical conductor in parallel to the single-wire line, FIG. 3 another embodiment of the inventive connection piece comprising two non-parallel additional conductors reaching up to the edge of the connection piece wall, FIG. 4 another embodiment of the invention comprising a non-parallel conductor extending up to about ¾ of the connection piece wall height, FIG. 5 another embodiment of the inventive connection piece comprising a non-parallel conductor extending up to beyond the edge of the connection piece wall, FIG. 6 another embodiment of the inventive connection piece comprising two additional conductors within said connection piece, extending in part in parallel, in part non-parallel to the single conductor of the level metering device, FIG. 7 another embodiment of the inventive connection piece comprising a bending additional electrical conductor, and FIG. 8 a view in detail of an attachment of the additional electrical conductor according to FIG. 6 in a thread bore.

DESCRIPTION OF EMBODIMENTS OF THE INVENTION

In FIG. 1, the general structure of a receptacle 60 can be seen. Receptacle 60 features an upper receptacle part 61 followed by a cylindrical receptacle wall 62. At the bottom end, receptacle 60 is closed by a receptacle bottom 63. Receptacle bottom 63 is, for example, welded to receptacle wall 62. The same applies to the connection between upper receptacle part 61 and receptacle wall 62. Within receptacle space 64, some kind of bulk good 65 is stored. Said bulk good 65 reaches up to a height $H_1$.

In the upper receptacle part 61, an opening 66 is present, into which a connection piece 20 is inserted. Connection piece 20 is composed of an upper connection piece part (21) (here a circular plate) and a cylindrical connection piece wall 22. Connection piece wall 22 is smaller in its diameter than the upper connection piece part 21. In the centre of the upper connection piece part 21, an opening (not shown here) is present, into which a level metering device 10 is mounted. It is to be noted here that the opening for level metering device 10 may of course also be positioned eccentrically. Level metering device 10 works on the guided microwave principle and comprises a single-wire line. The single wire line here is referenced 40. Said single-wire line extends into bulk good 65.

At a distance a, an additional conductor 30a is attached to the upper connection piece part 21. As shown in FIG. 1, the distance a from the free edge 23 of connection piece wall 22 changes. Distance a' gradually increases. In the embodiment shown here, the additional electrical conductor 30a, here a metal rod, reaches up to the edge 23 of the connection piece wall 22 and is in contact with same. The attachment of metal rod 30a on the upper connection piece part 21 can be effected by welding, bonding, clamping, fitting into a press-fitting, by means of a thread connection, etc.

Subsequently, the basic assessment of the filling level $H_1$ will be described with reference to FIG. 1. Within level metering device 10, high-frequency microwave pulses are generated and guided along the electrical conductor 40 in the direction of filling good 65. When impinging on the filling good surface, said microwave pulses are reflected. By assessing the transit time of the pulses under consideration of height $H_2$, the electronic unit integrated in level metering device 10 assesses and outputs filling level $H_1$.

Since an additional conductor 30a in the form of a metal rod is present here, the interfering reflections otherwise caused by connection piece 20, are attenuated or prevented. Here, the impedance is slowly matched by the non-parallelism of metal rod 30a. Therewith, even in cases of very high filling levels, with $H_1$ reaching into the area of connection piece 20, the filling level $H_1$ can be correctly assessed without interfering reflections.

In the following further embodiments of the invention according to FIGS. 2 through 8, those components are identically referenced which correspond to the embodiment as per FIG. 1. A detailed explanation of these reference numerals in conjunction with FIGS. 2 through 8 can therefore be renounced of. Reference is made in this respect to the description as per FIG. 1.

The embodiment of an inventive connection piece 20 shown in FIG. 2 features an additional electrical conductor 30b disposed in parallel to the single-wire line 40 of level metering device at a distance a. In this embodiment, conductor 30b reaches again up to connection piece edge 23, as it was likewise the case in the embodiment as per FIG. 1. The attachment of additional conductor 30b on the upper connection piece part can be configured alike the embodiment as per FIG. 1.

The embodiment of an inventive mounting piece shown in FIG. 3 only distinguishes from that shown in FIG. 1 in that two additional conductors 30a are present instead of a single additional conductor 30a. These additional electrical conductors 30a are disposed mirror-inverted opposite to the single-wire line 40 of level metering device 10. Yet, it is of course also possible to provide three or more additional conductors instead of two additional conductors 30a. In this case, these are preferably arranged to one another at equal angle spacings.

The embodiment as per FIG. 4 distinguishes from that as per FIG. 1 in that the additional electrical conductor 30c does not reach up to connection piece edge 23, but only extends up to about ⅔ or ¾ of connection piece wall height h. In this embodiment as per FIG. 4, the additional electrical conductor 30c is in contact with the inner side of connection piece wall 22 as well.

In contrast to the embodiment as per FIG. 4, the embodiment of an inventive connection piece as per FIG. 5 is provided with an additional electrical conductor 30d extending beyond the edge 23 of connection piece wall 22. The projected length $h_1$ of electrical conductor 30d from the upper connection piece part to its end is approximately 1.2-fold of the height h of the connection piece wall. Yet, cases are possible, where the relation $h_1$ to h is about 1.5, or even 2.5.

The embodiment of an inventive connection piece 20 shown in FIG. 6 comprises two additional electrical conductors 30e running in parallel to the single-wire line 40 of level metering device in a first partial area 30e', and assuming an increasing distance a from single-wire line 40 in a second partial area 30e''. The non-parallel portions 30e'' of conductors 30e in turn terminate in the area of the free edge 23 of connection piece wall 22. In this embodiment, it is, however, possible two provide only one conductor 30e instead of two conductors 30e.

A further embodiment of the inventive connection piece 20 is shown in FIG. 7. Here, an additional electrical conductor 30f is present. It is increasingly bending with an increasing distance from the upper connection piece part 21, reaching up to connection piece wall 22 and being in contact with same.

A view in detail of an attachment of an additional conductor 30e such as illustrated in FIG. 6, is shown in FIG. 8.

Here, the one end of the additional conductor 30e is provided with a thread 31. The thread end is screwed into a thread bore 24 of upper connection piece part 21. Thus, a simple, cost-efficient and extremely stable attachment of conductor 30e is obtained.

It is understood that depending on the case of application, the selection of the cross-sections and the material of the additional conductors can be varied. The same applies to the shape of the electrical conductor in its longitudinal direction.

LIST OF REFERENCE NUMERALS a distance
a' distance
$H_1$ filling level
$H_2$ distance upper connection piece part from bulk good surface
h connection piece wall height
$h_1$ projected length of an electrical conductor
10 level metering device
20 connection piece
21 upper connection piece part
22 connection piece wall
23 connection piece edge
24 thread bore
30a'' electrical conductor
30b electrical conductor
30c electrical conductor
30d electrical conductor
30e electrical conductor
30e' partial area of an electrical conductor
30e'' partial area of an electrical conductor
30f electrical conductor
31 thread
40 single-wire line
60 receptacle
61 upper receptacle part
62 receptacle wall
63 receptacle bottom
64 receptacle space
65 bulk good

What is claimed is:

1. A connection piece adapted to mount a guided microwave, single-wire level metering device to a receptacle, comprising
    an upper connection piece part adapted to operably connect to the level metering device,
    a connection piece wall disposed below said upper connection piece part, which connection piece wall has a connection piece wall height, and
    at least one electrical conductor disposed beside and at a distance from a single electrical line of the level metering device, the at least one electrical conductor extending from said upper connection piece part to at least 0.25 of the connection piece wall height.

2. The connection piece according to claim 1, wherein said at least one electrical conductor maximally extends up to the 2.5-fold of the connection piece wall height.

3. The connection piece according to claim 1, wherein said at least one electrical conductor runs in parallel to the single electric line of the level metering device.

4. The connection piece according to claim 1, wherein said connection piece consists of an electrically conductive material, and said at least one electrical conductor is in contact with the connection piece wall.

5. The connection piece according to claim 1, wherein said at least one electrical conductor is bent at least in a partial length area.

6. A connection piece, comprising
an upper connection piece part, in which a level metering device working on the guided microwave principle comprising a single electrical line can be mounted,
a connection piece wall disposed below said upper connection piece part, which connection piece wall has a connection piece wall height,
at least one electrical conductor disposed at a distance from the single electrical line of the level metering device to be mounted on the upper connection piece part and extending from said upper connection piece part to at least the 0.25-fold of the connection piece wall height
wherein the connection piece wall includes a free edge, and
wherein said at least one electrical conductor is so arranged that the distance from the single electric line of the level metering device increases towards the free edge of the connection piece wall.

7. The connection piece according to claim 6, wherein said at least one electrical conductor is in contact with the connection piece wall whereat the connection piece wall includes an electrically conductive material.

8. The connection piece according to claim 6, wherein said at least one electrical conductor is bent at least in a partial length area.

9. The connection piece according to claim 1, wherein the connection piece wall includes a free edge, and wherein said at least one electrical conductor terminates in the area of the free edge of the connection piece wall.

10. The connection piece according to claim 1, wherein said connection piece wall includes an area of an electrically conductive material, and said at least one electrical conductor is in contact with the area of the electrically conductive material of the connection piece wall.

11. A connection piece adapted to combine with a level metering device working on the guided microwave principle with a single electric line for guiding microwave pulses to a surface of a filling product to be measured and for back-guiding reflected pulses, wherein said connection piece comprises:
an upper connection piece part, in which the level metering device working on the guided microwave principle and comprising the single electric line can be mounted,
a connection piece wall connected to the upper connection piece part, which said connection piece has a connection piece wall height,
at least one electrical conductor mounted to at least one of the upper connection piece part and the connection piece wall and arranged at a distance from the single electric line of the level metering device, and
wherein the connection piece wall includes a free edge, and wherein said at least one electrical conductor terminates in the area of the free edge of the connection piece wall.

12. The connection piece according to claim 11, wherein said at least one electrical conductor maximally extends up to the 2.5-fold of the connection piece wall height.

13. The connection piece according to claim 11, wherein said at least one electrical conductor runs in parallel to the single electric line of the level metering device.

14. A connection piece adapted to combine with a level metering device working on the guided microwave principle with a single electric line for guiding microwave pulses to a surface of a filling product to be measured and for back-guiding reflected pulses, wherein said connection piece comprises:
an upper connection piece part, in which the level metering device working on the guided microwave principle and comprising the single electric line can be mounted,
a connection piece wall connected to the upper connection piece part, which said connection piece has a connection piece wall height,
at least one electrical conductor mounted to at least one of the upper connection piece part and the connection piece wall and arranged at a distance from the single electric line of the level metering device, and
wherein said connection wall piece consists of an electrically conductive material, and said at least one electrical conductor is in contact with the electrically conductive material of the connection piece wall.

15. The connection piece according to claim 11, wherein said at least one electrical conductor is bent at least in a partial length area.

16. A connection piece adapted to combine with a level metering device working on the guided microwave principle with a single electric line for guiding microwave pulses to a surface of a filling product to be measured and for back-guiding reflected pulses, wherein said connection piece comprises:
an upper connection piece part, in which the level metering device working on the guided microwave principle and comprising the single electric line can be mounted,
a connection piece wall connected to the upper connection piece part, which said connection piece has a connection piece wall height,
at least one electrical conductor mounted to at least one of the upper connection piece part and the connection piece wall and arranged at a distance from the single electric line of the level metering device, and
wherein the connection piece wall includes a free edge, and wherein said at least one electrical conductor is so arranged that the distance from the single electric line of the level metering device increases towards the free edge of the connection piece wall.

17. The connection piece according to claim 16, wherein said connection piece consists of an electrically conductive material, and said at least one electrical conductor is in contact with the connection piece wall of the connection piece.

18. The connection piece according to claim 16, wherein said at least one electrical conductor is bent at least in a partial length area.

19. A level metering device working on the guided microwave principle, comprising:
a single electric line for guiding microwave pulses to a surface of a filling product to be measured and for back-guiding reflected pulses,
an attachment means adapted to connect to a receptacle containing the filling product and guide the single electrical line to the receptacle,
at least one electrical conductor arranged at a distance from the single electric line of the level metering device and only extends in an area which is critical due to interfering reflections; and
wherein said connection piece consists of an electrically conductive material, and said at least one electrical conductor is in contact with the connection piece.

20. The device according to claim 19, wherein the attachment means includes a connection piece and comprises a connection piece height, and said at least one electrical conductor maximally extends up to the 2.5-fold of the connection piece height.

21. A level metering device working on the guided microwave principle, comprising:
- a single electric line for guiding microwave pulses to a surface of a filling product to be measured and for back-guiding reflected pulses,
- an attachment means adapted to connect to a receptacle containing the filling product and guide the single electrical line to the receptacle,
- at least one electrical conductor arranged at a distance from the single electric line of the level metering device and only extends in an area which is critical due to interfering reflections, and
- wherein said at least one electrical conductor is so arranged that it runs in parallel to the single electric line of the level metering device.

22. The device according to claim 19, wherein said at least one electrical conductor is bent at least in a partial length area.

23. A level metering device working on the guided microwave principle, comprising:
- a single electric line for guiding microwave pulses to a surface of a filling product to be measured and for back-guiding reflected pulses,
- an attachment means adapted to connect to a receptacle containing the filling product and guide the single electrical line to the receptacle,
- at least one electrical conductor arranged at a distance from the single electric line of the level metering device and only extends in an area which is critical due to interfering reflections, and
- wherein the connection piece includes a free edge, and wherein said at least one electrical conductor is so arranged that the distance from the single electric line of the level metering device increases towards the free edge of the connection piece.

24. The device according to claim 23, wherein said at least one electrical conductor is in contact with the connection piece.

25. The device according to claim 23, wherein said at least one electrical conductor is bent at least in a partial length area.

26. The device according to claim 20, wherein the connection piece includes a free edge, and wherein said at least one electrical conductor terminates in the area of the free edge of the connection piece.

27. A combination of a level metering device working on the guided microwave principle, which is equipped with a single electric line for guiding microwave pulses to a surface of a filling product to be measured and for back-guiding reflected pulses, and a connection piece comprising a connection piece wall having a height, which connection piece wall terminates in a free edge, wherein said level metering device is mounted on said connection piece, which comprises at least one electrical conductor arranged at a distance from the single electric line of the level metering device, and which electrical conductor terminates in the area of the free edge of the connection piece wall.

28. A connection piece adapted to connect a microwave, single-wire level measurement device to a receptacle, comprising:
- an upper part adapted to connect the metering device to the receptacle,
- a wall part connected to the upper part, the wall part including a height, the wall part defining an interior adapted to allow a single-wire line of the metering device to extend into the receptacle; and
- at least one conductor within the interior of the wall part and spaced from the single-wire line, wherein the at least one conductor has a length at least 0.25 times the height of the wall part and
- wherein the at least one conductor is adapted to reduce interfering reflections received by the single-wire line of the metering device.

29. The connection piece of claim 28, wherein the at least one conductor includes a metal rod.

30. A connection piece adapted to combine with a level metering device working on the guided microwave principle with a single electric line for guiding microwave pulses to a surface of a filling product to be measured and for back-guiding reflected pulses, wherein said connection piece comprises:
- an upper connection piece part, in which the level metering device working on the guided microwave principle and comprising the single electric line can be mounted,
- a connection piece wall connected to the upper connection piece part, which said connection piece has a connection piece wall height,
- at least one electrical conductor mounted to at least one of the upper connection piece part and the connection piece wall and arranged at a distance from the single electric line of the level metering device, and
- wherein the at least one conductor is adapted to reduce interfering reflections received by the single electric line of the level metering device and extends only to a length that is critical to reducing the interfering reflections.

31. The connection piece according to claim 11, wherein said connection piece wall includes an area of an electrically conductive material, and said at least one electrical conductor is in contact with the area of the electrically conductive material of the connection piece wall.

32. A connection piece adapted to connect a microwave, single-wire level measurement device to a receptacle, comprising:
- an upper part adapted to connect the metering device to the receptacle,
- a wall part connected to the upper part, the wall part including a height, the wall part defining an interior adapted to allow a single-wire line of the metering device to extend into the receptacle; and
- means for reducing interference or echos received by a single electric line of the level metering device connected to at least one of the upper part and the wall part.

* * * * *